United States Patent
Bynam et al.

(10) Patent No.: US 9,184,959 B2
(45) Date of Patent: Nov. 10, 2015

(54) METHOD AND APPARATUS FOR JOINT PACKET DETECTION AND RADIO FREQUENCY (RF) PULSE SYNCHRONIZATION IN A SUPER-REGENERATIVE RECEIVER (SRR)

(71) Applicant: Samsung Electronics Co., Ltd., Suwon-si (KR)

(72) Inventors: Kiran Bynam, Bangalore (IN); Subhra Chakraborty Tuhin, Bangalore (IN); Young Jun Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 14/063,218

(22) Filed: Oct. 25, 2013

(65) Prior Publication Data

US 2014/0119477 A1    May 1, 2014

(30) Foreign Application Priority Data

Oct. 25, 2012 (IN) .......................... 4453/CHE/2012
May 10, 2013 (KR) ........................ 10-2013-0052982

(51) Int. Cl.
*H04L 27/06* (2006.01)

(52) U.S. Cl.
CPC .............. *H04L 27/06* (2013.01); *H04L 27/063* (2013.01)

(58) Field of Classification Search
CPC ........... H03D 11/02; H03D 11/06; H04B 1/30
USPC .................................. 375/340, 343, 142, 145
See application file for complete search history.

(56) References Cited

U.S. PATENT DOCUMENTS

| | | | |
|---|---|---|---|
| 6,668,165 B1* | 12/2003 | Cloutier | 455/336 |
| 2005/0069051 A1* | 3/2005 | Lourens | 375/316 |
| 2007/0139130 A1* | 6/2007 | Kim et al. | 331/185 |
| 2009/0017782 A1 | 1/2009 | Monat et al. | |
| 2009/0156158 A1* | 6/2009 | Kang et al. | 455/336 |
| 2010/0109783 A1* | 5/2010 | Bohorquez | 330/302 |
| 2011/0274141 A1* | 11/2011 | Jantunen et al. | 375/138 |
| 2012/0307839 A1* | 12/2012 | Ionescu et al. | 370/431 |
| 2014/0017638 A1* | 1/2014 | Akizumi et al. | 433/228.1 |
| 2014/0019828 A1* | 1/2014 | Mihai Ionescu et al. | 714/776 |
| 2014/0093019 A1* | 4/2014 | Oehler et al. | 375/343 |

FOREIGN PATENT DOCUMENTS

KR    10-2009-0063083 A    6/2009

* cited by examiner

*Primary Examiner* — Kenneth Lam
*Assistant Examiner* — Sung Ahn
(74) *Attorney, Agent, or Firm* — NSIP Law

(57) ABSTRACT

A method of increasing a performance of a super-regenerative receiver (SRR), includes initializing a quench rate to be greater than or equal to 2 based on a parameter, and comparing a decision metric to a lower threshold value, the decision metric established from a first receiver operating characteristic (ROC). The method further includes estimating a phase offset, using an over-quench method, and aligning quench signals at the quench rate of 1, and comparing the decision metric to a higher threshold value to minimize a false alarm probability. The method further includes confirming packet detection and the phase offset, using the over-quench method.

15 Claims, 15 Drawing Sheets

METHOD AND APPARATUS FOR JOINT PACKET DETECTION AND RADIO FREQUENCY (RF) PULSE SYNCHRONIZATION IN A SUPER-REGENERATIVE RECEIVER (SRR)

CROSS-REFERENCE TO RELATED APPLICATIONS

This application claims the benefit under 35 USC 119(a) of Indian Patent Application No. 4453/CHE/2012, filed on Oct. 25, 2012, in Indian Patent Office, and Korean Patent Application No. 10-2013-0052982, filed on May 10, 2013, in the Korean Intellectual Property Office, the entire disclosures of which are incorporated herein by reference for all purposes.

BACKGROUND

1. Field

The following description relates to a super-regenerative receiver (SRR).

2. Description of Related Art

In general, a super-regenerative receiver (SRR) may be configured with much lower energy, lower power consumption, and fewer components. In addition, the SRR may be operated at a lower voltage, when compared to a homodyne or super-heterodyne receiver, and thus, may be suitable for a communication system using a low-cost and low-power receiver.

An SRR-based reception technique may be non-coherent in nature as a phase of an incoming signal may not play a role in a detection process. Hence, the SRR-based reception technique may rely on amplitude-based modulation techniques, namely, on-off keying (OOK), to transmit information, and be operated in a linear mode or a logarithmic mode based on whether an output is saturated. The OOK may be the simplest form of amplitude-shift keying (ASK) modulation in which digital data is represented as a presence or absence of a carrier wave.

In a number of wireless networking schemes, data may be shared using packets transmitted in a random access manner through a wireless channel. A receiver in such an arrangement may not be aware of a receipt time of a packet, and thus, monitoring the wireless channel and attempting to detect a packet upon arrival are necessary. The packet detection may be performed by correlating an input signal of the receiver with another signal to generate a correlation coefficient. The input signal may be cross-correlated with a pattern known to be within a header of each packet, or auto-correlated with itself, to generate the correlation coefficient. Once the correlation coefficient is generated, the correlation coefficient may be compared to a fixed threshold value to determine whether a packet has arrived. Arrival of a packet may be assumed when the correlation coefficient is greater than the fixed threshold value.

When noise results in a correlation coefficient greater than the fixed threshold value used by a receiver, the receiver may improperly indicate detection of a packet, resulting in a situation referred to as a false alarm. When a false alarm occurs, the receiver may process a signal before the detection is recognized as a false alarm, and thus, energy may be wasted due to unnecessary signal processing being performed by the receiver. Subsequent to recognition of a false alarm, a state of the receiver may be reset to an acquisition mode. When an actual packet is received before the state of the receiver is reset, or when a strength of the signal is poor when compared to the noise, the packet may not be detected by the receiver, resulting in a missed packet. Retransmission of the missed packet may be necessary, which may result in a reduction of throughput in a network as well as an unwarranted consumption of energy. Due to low power consumption in devices, such as, battery operated devices, being a major global research goal at present, there is a desire for developing receiver techniques to increase a packet detection rate while minimizing a false alarm rate of a wireless network receiver, namely, in a low signal-to-noise ratio (SNR) region. The developing of receiver techniques may have a benefit of not only reducing retransmissions and switching off unwanted signal processing, but also reducing transmission power. In consideration of a fact that power amplifiers in transmitters are inefficient in current technology, reducing transmission power may have an even higher order impact.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of increasing a performance of a super-regenerative receiver (SRR), the method includes initializing a quench rate to be greater than or equal to 2 based on a parameter, and comparing a decision metric to a lower threshold value, the decision metric established from a first receiver operating characteristic (ROC). The method further includes estimating a phase offset, using an over-quench method, and aligning quench signals at the quench rate of 1, and comparing the decision metric to a higher threshold value to minimize a false alarm probability. The method further includes confirming packet detection and the phase offset, using the over-quench method.

The method may further include determining whether a start frame delimiter (SFD) is detected, and detecting a payload in response to the SFD being determined to be detected.

The parameter may include a length of a direct-sequence spread spectrum code, or an over-quench rate (OQR), or an SRR gain, or a modulation scheme, or a target signal-to-noise ratio (SNR), or a bandwidth, or a pulse-shape filter response, or a selectivity, or any combination thereof.

The comparing of the decision metric to the lower threshold value may include comparing the decision metric to the lower threshold value, the decision metric established from the first ROC, to maximize a packet detection probability.

The method may further include aligning the quench signals based on the confirmed phase offset.

The comparing of the decision metric to the higher threshold value may include comparing the decision metric to the higher threshold value, the decision metric established from a second ROC, to minimize the false alarm probability for optimal packet detection and false alarm probability performance.

In another general aspect, an apparatus configured to increase a performance of a super-regenerative receiver (SRR), includes a processor configured to initialize a quench rate to be greater than or equal to 2 based on a parameter, and compare a decision metric to a lower threshold value, the decision metric established from a first receiver operating characteristic (ROC). The processor is further configured to estimate a phase offset, using an over-quench method, and align quench signals at the quench rate of 1, and compare the decision metric to a higher threshold value to minimize a false alarm probability. The processor is further configured to confirm packet detection and the phase offset, using the over-quench method.

The processor may be further configured to determine whether a start frame delimiter (SFD) is detected, and detect a payload in response to the SFD being determined to be detected.

The processor may be configured to compare the decision metric to the lower threshold value, the decision metric established from the first ROC, to maximize a packet detection probability.

The processor may be further configured to align the quench signals based on the confirmed phase offset.

The processor may be configured to compare the decision metric to the higher threshold value, the decision metric established from a second ROC, to minimize the false alarm probability for optimal packet detection and false alarm probability performance.

In still another general aspect, a receiver configured to handle packet detection and radio frequency (RF) pulse synchronization, includes a processor configured to initialize a quench rate to be greater than or equal to 2 based on a parameter, and compare a decision metric to a lower threshold value, the decision metric established from a first receiver operating characteristic (ROC). The processor is further configured to estimate a phase offset, using an over-quench method, and align quench signals at the quench rate of 1, and compare the decision metric to a higher threshold value to minimize a false alarm probability. The processor is further configured to confirm the packet detection and the phase offset, using the over-quench method.

The processor may be configured to handle the RF pulse synchronization between an input signal and the quench signals generated by a quench oscillator within the receiver.

In yet another general aspect, a super-regenerative receiver (SRR) includes a processor configured to initialize a quench rate to be greater than 1 based on a parameter, and determine whether a packet is detected based on whether a decision metric is greater than a first threshold set to maximize a packet detection probability. The processor is further configured to determine whether confirmation of the packet detection is needed based on the parameter. The processor is further configured to estimate a phase offset, align quench signals based on the phase offset at the quench rate of 1, and confirm whether the packet is detected based on whether the decision metric is greater than a second threshold set to minimize a false alarm probability, in response to the confirmation being determined to be needed.

The parameter may include a length of a direct-sequence spread spectrum code.

The processor may be further configured to perform a correlation on an input signal based on the quench rate and/or the aligned quench signals to generate the decision metric.

The first threshold may be greater than the second threshold.

The processor may be configured to re-estimate the phase offset at the quench rate of greater than 1, and re-align the quench based on the re-estimated phase offset, in response to the packet being confirmed to be detected.

Other features and aspects will be apparent from the following detailed description, the drawings, and the claims.

Figure 1:
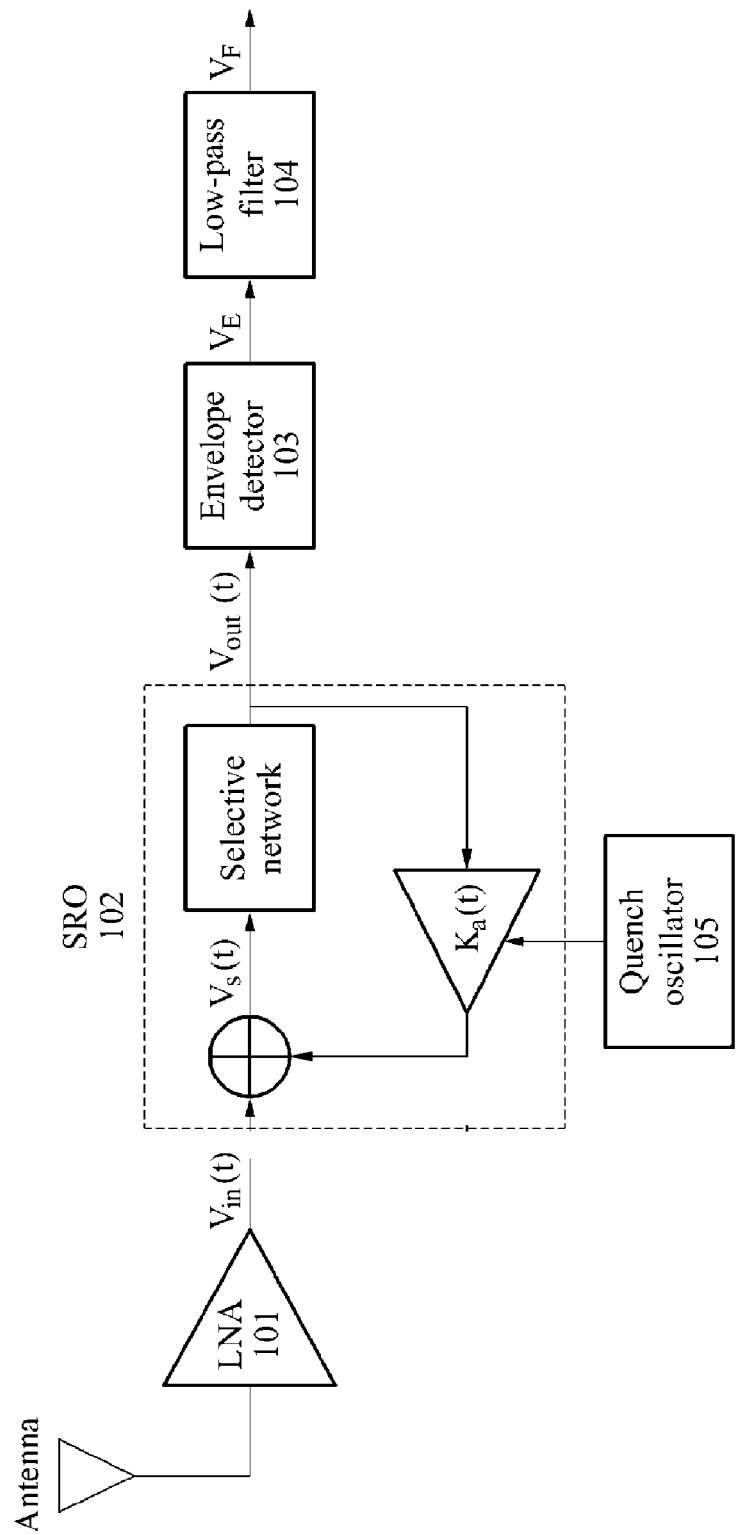
FIG. 1 is a diagram illustrating an example of a super-regenerative receiver (SRR).

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Due to the aforementioned reasons, there is a need for a method of maximizing a packet detection probability while minimizing a false alarm probability at a receiver side, namely, in a low signal-to-noise ratio (SNR) region. However, handling packet detection and RF pulse synchronization jointly, while using an optimal quench rate for a best possible selectivity, may be beneficial, because a performance of a super-regenerative receiver (SRR) is relatively sensitive to a phase of an incoming modulated radio frequency (RF) pulse.

Herein, a method and an apparatus that maximizes a packet detection probability in a SRR may be achieved. Further, the method includes phase offset estimation using an over-quench method.

The method disclosed herein may include initializing a quench rate to an integer value prior to a packet detection. The integer value may be greater than or equal to 2. In the method, sampled values of a single input signal pulse may be obtained at multiple phase points, using the higher order quench rate generated in the SRR. Maximum energy concentration of the incoming pulse, optionally correlating to a pseudo noise (PN) sequence, may be determined based on a correlation metric to form a decision metric. Further, in order to increase a probability of detection (PD) at a first hand after a preliminary detection is performed, the decision metric may be compared to a lower threshold value established from an available first receiver operating characteristic (ROC1). An open-loop higher quenching method may be used to perform coarse RF pulse synchronization. In the open-loop higher quenching method, another suitable higher quench rate may be used, as needed. Subsequent to alignment of a quench signal phase, the quench rate may be changed to a unity to obtain a best possible selectivity and ROC, and a packet detection decision may be confirmed by comparing the decision metric to a second higher threshold value while minimizing a false alarm rate. Fine RF pulse synchronization may be performed using the same over-quench method to minimize a preamble length, and a best possible over-quench rate (OQR), in terms of selectivity, may be used as a unity. Further, start frame delimiter (SFD) detection may be performed, followed by payload detection.

FIG. 1 illustrates an example of an SRR. Referring to FIG. 1, the SRR includes an antenna, a low noise amplifier (LNA) 101, a super-regenerative oscillator (SRO) 102, an envelope detector 103, a low-pass filter 104, and a quench oscillator 105. The antenna receives a signal transmitted based on on-off keying (OOK), and transmits the signal to the LNA 101. The LNA 101 amplifies the signal to generate an input signal $V_{in}(t)$. In addition, the LNA 101 isolates an RF pulse in the antenna from the SRO 120 to prevent interference.

The SRO 102 is an RF oscillator, and a transient response of the RF oscillator is used to filter and amplify the weak input signal $V_{in}(t)$. That is, the SRO 102 is modeled as a feedback control system. The SRO 102 controls a phase of a feedback voltage, using a time varying amplification factor based on a low frequency quench signal. Controlling the time varying amplification factor provides an alternative to varying effective damping in a second order system from positive to negative, and negative to positive. Further, the quench oscillator 105 oscillates between the positive and the negative, which pushes a resonant circuit in a selective network from a positive feedback system to a negative feedback system, and vice versa. During a positive feedback, oscillations of a data signal are amplified in proportion to the input signal $V_{in}(t)$. The quench oscillator 105 controls a gain $K_a(t)$ of the SRO 102. The main principle of the SRR is that the quench oscillator 105 causes periodic buildup and decay of RF oscillations. Therefore, the SRO 102 outputs an output signal $V_{out}(t)$ that includes RF pulses separated by a quench period.

The envelope detector 103 detects an envelope $V_E$ of the output signal $V_{out}(t)$. The low-pass filter 104 performs low-pass filtering on the envelope $V_E$ to generate a filtered envelope $V_F$.

Figure 2:
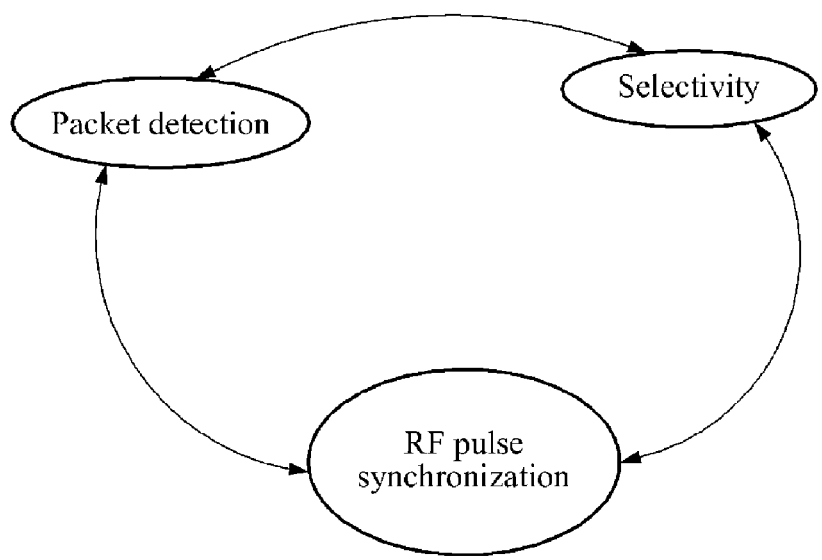
FIG. 2 is a diagram illustrating an example of an interdependency among packet detection, radio frequency (RF) pulse synchronization, and a selectivity.

FIG. 2 illustrates an example of an interdependency among packet detection, RF pulse synchronization, and a selectivity. Referring to FIG. 2, parameters, for example, packet detection, RF pulse synchronization, and a selectivity, may be performed concurrently while optimizing a performance of a receiver in terms of not only an SNR gain, but also minimizing a size of a preamble requirement. For a low power system, achieving both the RF pulse synchronization and the packet detection with a sufficient quality may present a dependency issue in that without the RF pulse synchronization, the packet detection would not be viable, and without the packet detection, the RF pulse synchronization would not be viable. For example, when the RF pulse synchronization is not achieved first, a quality of the packet detection may deteriorate. Conversely, when sufficient high-quality packet detection is not achieved first, a quality of the RF pulse synchronization may be less reliable. When both the RF pulse synchronization and the packet detection are performed concurrently, adverse conditions of an SRR may arise, for example, a poor selectivity. In such an example, operating at OQR=1 may be optimal to obtain a best possible selectivity.

However, a detailed review reveals that when an RF pulse is not phase-aligned and remains non-deterministic, higher over-quenching may aid in achieving a better ROC as well as better packet detection and synchronization performance. Namely, a predetermined higher OQR may be governed by other system parameters including "pnlen" denoting a length of a used direct-sequence spread spectrum code, and may need to be assessed on a case-by-case basis. The other system parameters may include an OQR, an SRR gain, a modulation scheme, a target SNR, a bandwidth, a pulse-shape filter response, a selectivity, and/or other parameters known to one of ordinary skill in the art.

Figure 3:
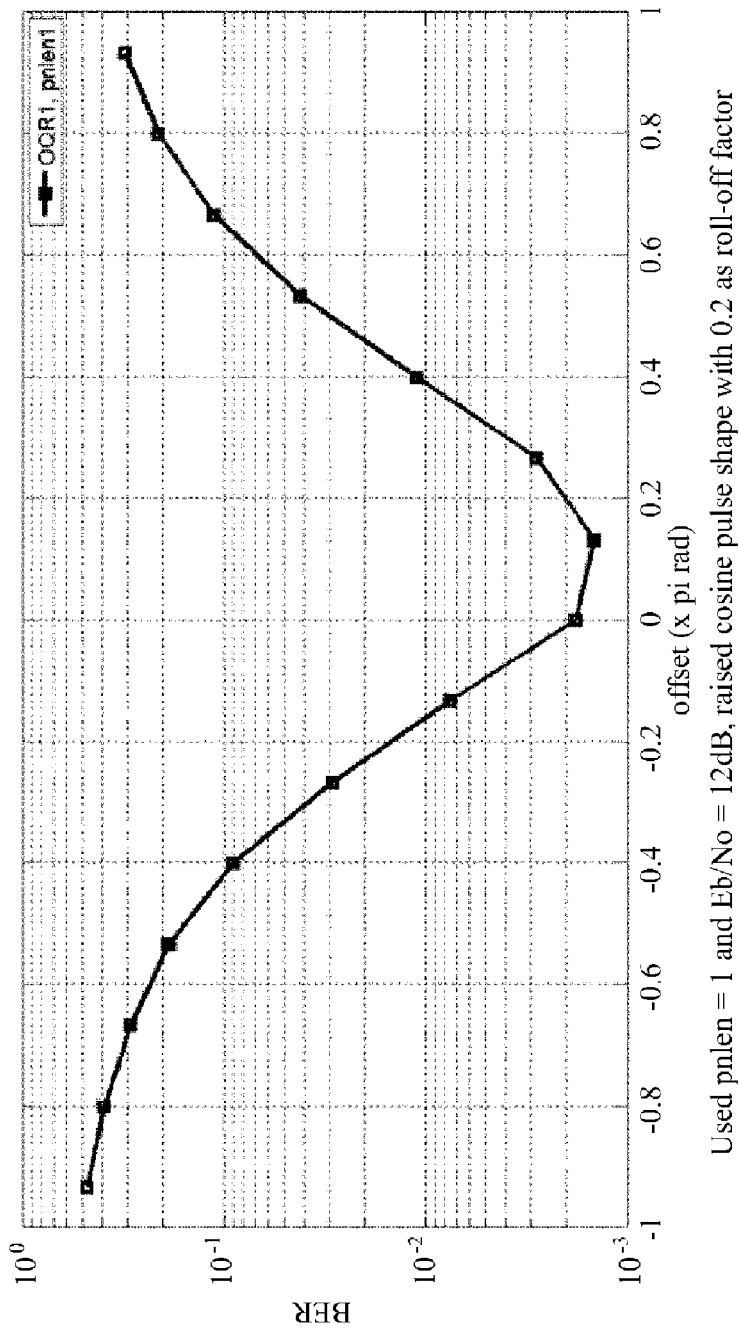
FIG. 3 is a graph illustrating an example of a performance, namely, a bit error rate (BER), of an SRR-based system, which is relatively sensitive to RF pulse synchronization measured in terms of a phase offset between an RF pulse and a quench signal.

FIG. 3 illustrates an example of a performance, namely, a bit error rate (BER), of an SRR-based system, which is relatively sensitive to RF pulse synchronization measured in terms of a phase offset between an RF pulse and a quench signal. As shown in FIG. 3, when an incoming RF pulse is not matched to a sensitivity curve inherent to the SRR, such a mismatch may be known as a phase offset limited to $-T_q/2$ to $+T_q/2$, mapped to $-\pi$ to $+\pi$ as a means of normalization. $T_q$ denotes a quench period. A fundamental need for RF pulse synchronization due to a fact that a BER may degrade as a phase offset increases, is illustrated in FIG. 3.

A pulse shape to be used may be a significant factor in a phase offset estimation. The greater an amount of energy concentrated in a pulse, the greater an accuracy of phase offset estimation. Referring to FIG. 3, without a loss of generality, a raised cosine pulse shape may be fixed with a roll-off factor of 0.2 or 0.5. Further, provided that other similar pulse shapes are also concentrated toward a middle, a developed methodology may also be applied absent limitations.

Figure 4:
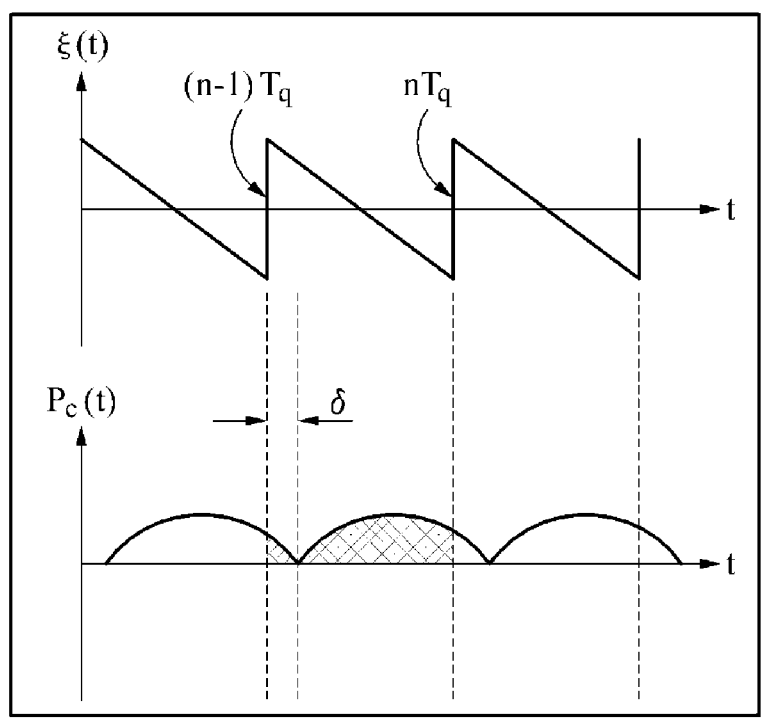
FIG. 4 is a diagram illustrating an example of a change in an integration window in an SRR for a predetermined phase offset between a quench signal and an input RF pulse.

FIG. 4 illustrates an example of a change in an integration window in an SRR for a predetermined phase offset between a quench signal and an input RF pulse. An issue of phase offset estimation will be described herein. Estimating a phase offset, using OQR=1, may be optimal because of a poorer selectivity in higher over-quenching.

In FIG. 4, a scenario in which a phase offset δ is present between a quench signal $\xi(t)$ and an input RF pulse $P_c(t)$ is shown. Equation 1 expresses an output of an SRR. The effective input RF pulse for match filtering (or rather a correlation with $\xi(t)$) may be changed as shown in a shaded area. Accordingly, by sampling the output of the SRR when the quench signal ends $(nT_q)$, a variation of an amplitude based on the phase offset may be clearly indicated. For example, when the RF pulse $P_c(t)$ corresponds to Gaussian function, a correlation with a Gaussian sensitivity curve s(t) may also correspond to Gaussian of a function δ. Accordingly, when a phase offset equals zero, a maximum amplitude may be generated and remaining portions may be diminished. The relationship between the maximum amplitude and the remaining portions may be used to develop a closed loop solution for phase offset estimation.

$$V_{out}(nT_q) = \sqrt{\alpha^2(nT_q) + \beta^2(nT_q)} \quad (1)$$

$$\alpha(nT_q) = K \int_{(n-1)T_q}^{nT_q} \{p_{cI}(\tau) + n_I(\tau)\}s(\tau)d\tau$$

$$\beta(nT_q) = K \int_{(n-1)T_q}^{nT_q} \{-n_Q(\tau)\}s(\tau)d\tau$$

In Equation 1, K denotes a system dependent constant.

An impact of a higher OQR on achievable ROCs may be first investigated for various scenarios discussed herein.

Figure 5:
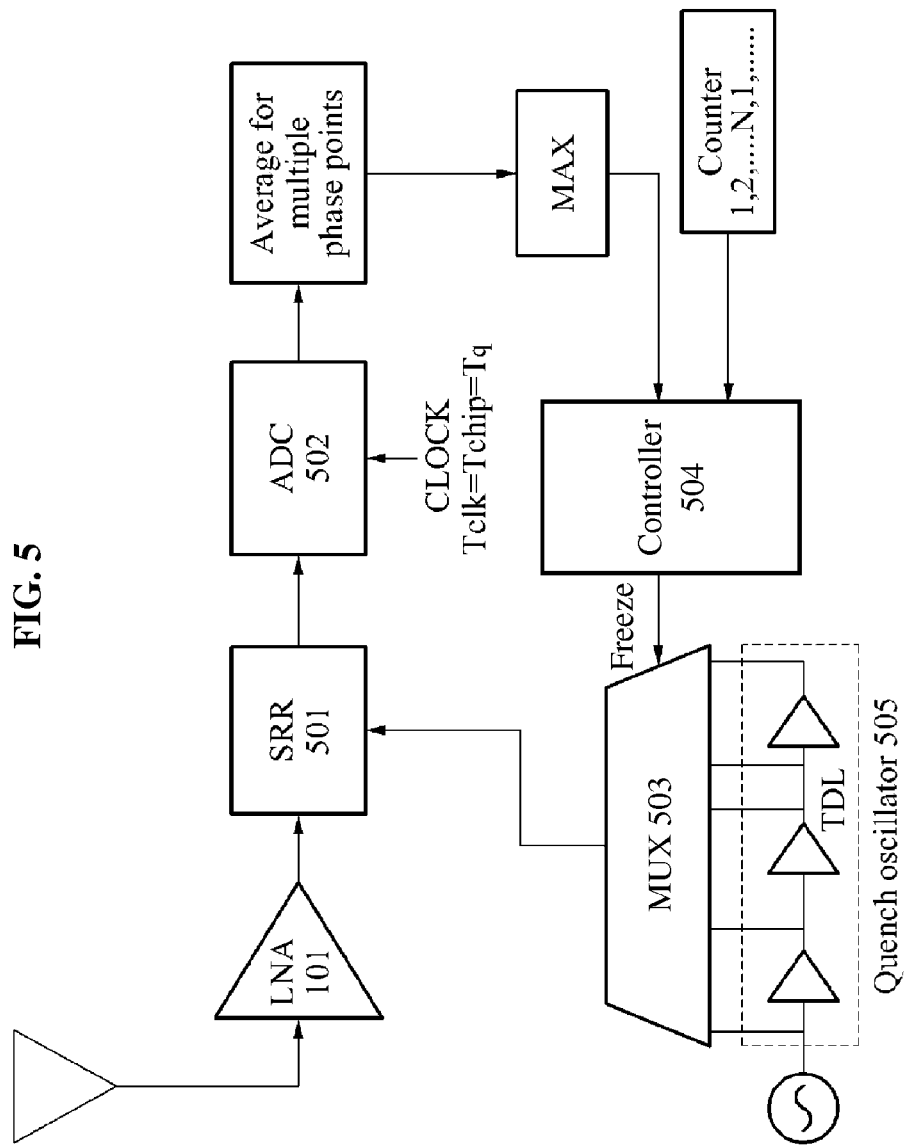
FIG. 5 is a diagram illustrating an example of a tapped-delay-line (TDL) based method for phase offset estimation and correction.

FIG. 5 illustrates an example of a tapped-delay-line (TDL) based method for phase offset estimation and correction. In FIG. 5, an LNA 101, an SRR 501, an analog-to-digital converter (ADC) 502, a multiplexer (MUX) 503, a controller 504, and a quench oscillator 505 are illustrated.

The quench oscillator 505 generates quench waveforms, for which a single sample may be collected, respectively. A tapped delay line (TDL) of the quench oscillator 505 is a controller that controls a quench waveform 40 to correspond to a predetermined delay value. The MUX 503 controls the TDL.

The controller 504 fixes a phase value by controlling the MUX 503 to control the quench waveform, and obtaining a result value that is digitized through the ADC 502, namely, a maximum delay value among averages of result values of the ADC 502 for multiple phase points. Concisely, the controller 504 controls the TDL through the MUX 503, using a counter until the maximum delay value of the quench waveform is obtained. The controller 504 obtains a sufficient number of ADC samples, and recognizes a corresponding position as pulse timing when a predetermined delay value is the maximum delay value.

Based on the foregoing, the ADC 502 converts a result value of the SRR 501 into a digital value, and the controller 504 obtains the pulse timing by recognizing the maximum delay value among average values of the ADC samples according to the delay value. A MAX unit selects the maximum delay value, and the counter is an internal counter used to control the TDL and repeatedly change the delay value, before obtaining the pulse timing. The maximum value of the counter is relative to a number of TDLs. The average for the multiple phase points is an average value according to the delay value of the TDL, and the value occurring in the counter is the delay value. By way of such a delay value, the phase point is changed.

To sum, the counter is changed, and then the TDL delay is changed. An ADC sample for each phase point is obtained, and the an average for each counter value is obtained. The maximum delay value is obtained. When the maximum delay value is satisfied, the controller 504 recognizes the corresponding value as the pulse timing and freezes without further changes to the counter.

A response for N phase points may be collected by changing a phase of a quench signal in a periodic manner. For example, for each phase point, M samples may be collected. In this example, the collection of the M samples may need (N+1)×M preamble bits. Further, average statistics for each phase point may be obtained. From the collected samples, the phase of the quench signal generating a maximum amplitude may be verified. Accordingly, the obtained phase, for example, the phase of the quench signal generating the maximum amplitude, may be used as an estimated phase offset, and compensated for through digital control.

An issue of the TDL based method may be in that the preamble requirement is relatively high and thus, may be inapplicable as an efficient solution for RF pulse synchronization. For example, when N is set to 10 and M is set to 5, a combination of 10 phase points and 5 samples may require 55 preamble bits which is relatively long.

In order to overcome drawbacks of the long preamble in a TDL based approach for phase offset estimation, an open loop solution may be implemented. The open loop solution may be implemented based on a fact that multiple phase point information from a single RF pulse is needed. As described in the TDL based method, when N phase points are used, a mean of the estimated offset may be less than or equal to $T_q/(2\times N)$. In an open loop method, over-quenching by N may be performed to achieve a mean similar to the TDL based method. Further, the open loop method may also be known as an over-quench method.

Figure 6:
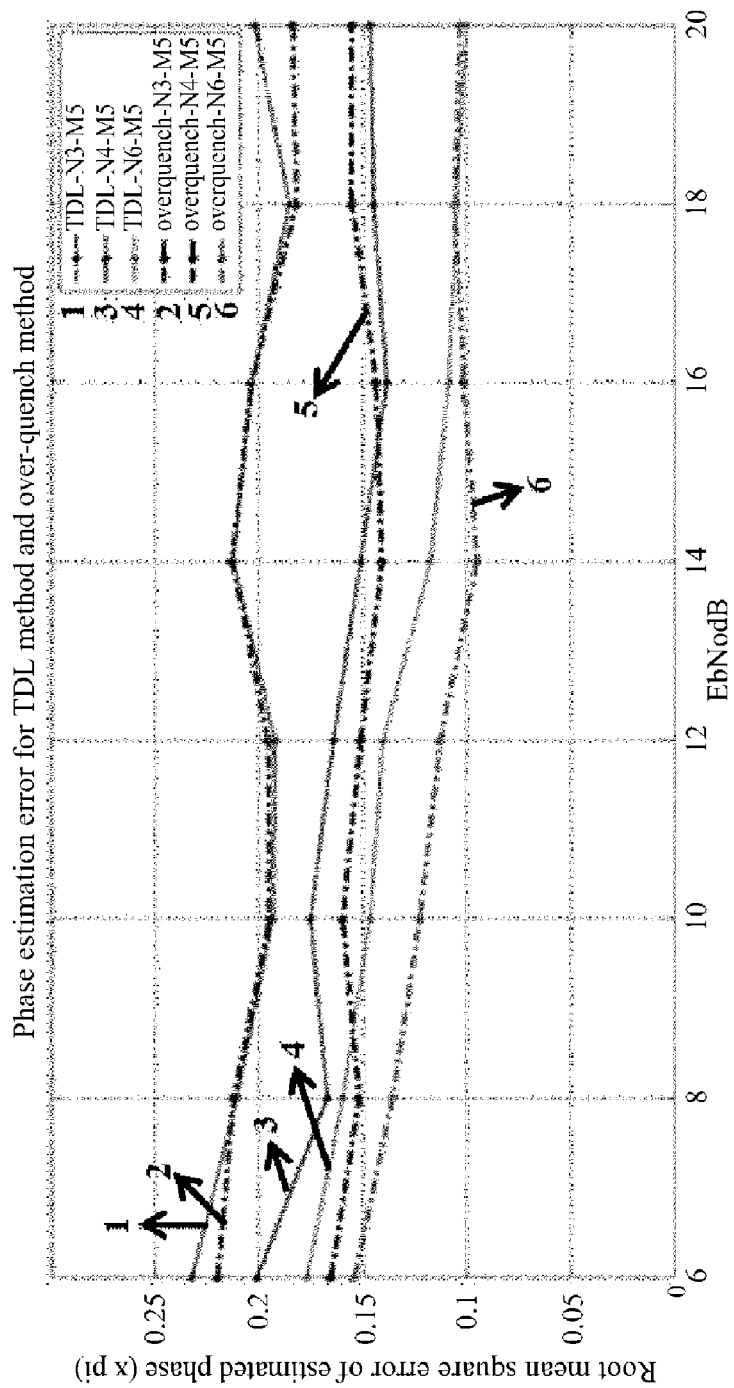
FIG. 6 is a graph illustrating an example of root mean square (RMS) errors in phase estimation using a TDL method and an over-quench method, for estimation at different energy per bit to noise power spectral density ratios ($E_b/N_o$'s).

FIG. 6 illustrates an example of root mean square (RMS) errors in phase estimation using a TDL method and an over-quench method, for estimation at different energy per bit to noise power spectral density ratios $E_b/N_o$'s. In FIG. 6, at various instances, an over-quench method may be as efficient as or better than a counterpart TDL based method. Further, averaging over longer bits may not provide significant improvement. An open loop solution may be preferred when compared to a closed loop solution due to less hardware and preamble requirements. Accordingly, from a low energy point of view, as fewer preamble bits are to be used for phase offset estimation, the over-quench method may be more efficient than the counterpart TDL based method.

Figure 7:
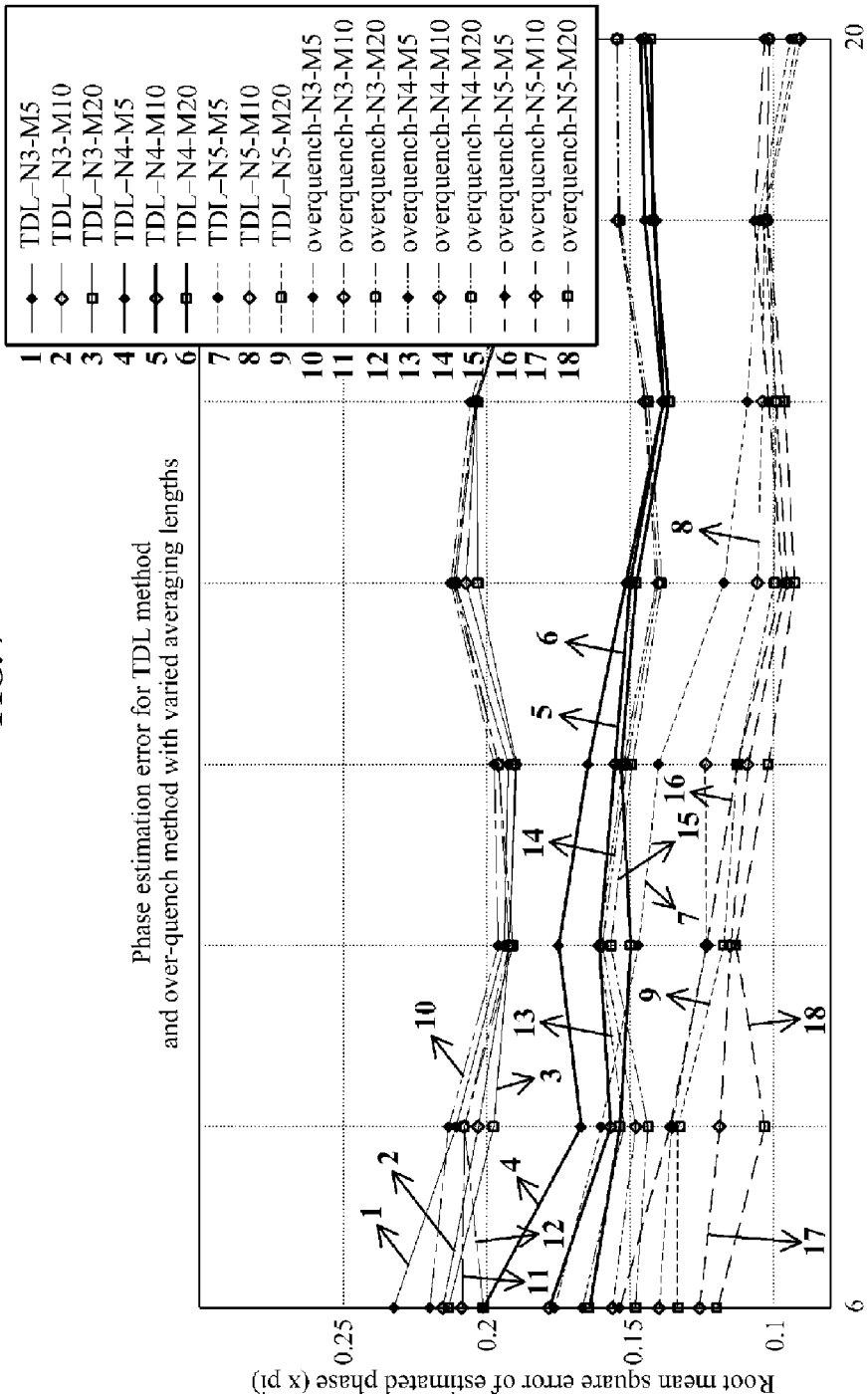
FIG. 7 is a graph illustrating an example of phase estimation errors for a TDL method and an over-quench method with varied averaging lengths.

FIG. 7 illustrates an example of phase estimation errors for a TDL method and an over-quench method with varying average lengths. The example of FIG. 7 provides a comparison of similar characteristics to establish a fact that the over-quench method is as efficient as or superior to the TDL method, despite operating at a low power state.

Figure 8:
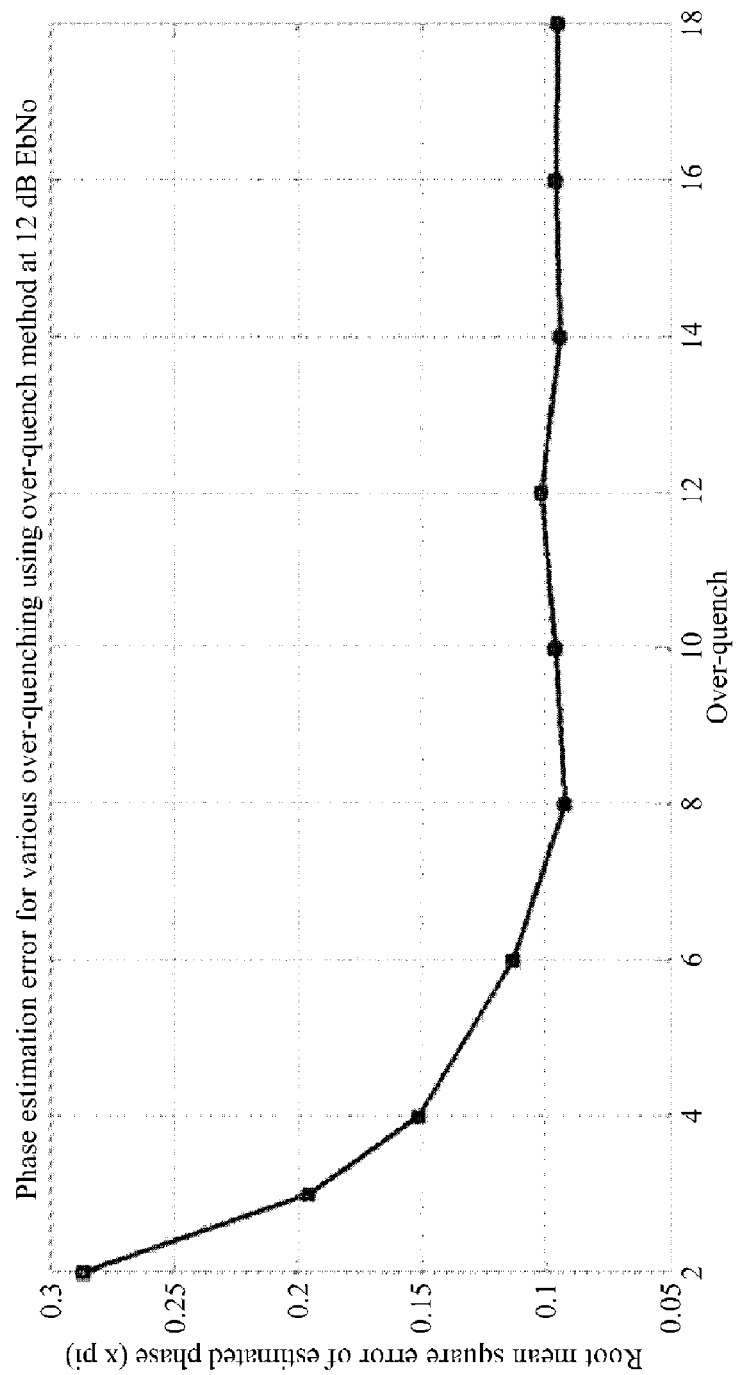
FIG. 8 is a graph illustrating an example of phase estimation errors for various over-quenching using an over-quench method of establishing a saturation nature after a predetermined over-quench value.

FIG. 8 illustrates an example of phase estimation errors for various over-quenching using an over-quench method of establishing a saturation nature after a predetermined over-quench value. Referring to FIG. 8, when an OQR value increases, an RMS error of phase estimation may saturate to a value of a phase offset that may be sufficient from a system design perspective, for example, a value of about 0.1π. Accordingly, an OQR value of 6 to 8 may be needed in practice. Such numbers may be experimental in nature.

In the preceding, examples are provided to illustrate the open-loop, over-quench method for phase offset estimation, under low power conditions. Hereinafter, descriptions and examples are provided on an effect of a phase offset that may be achieved in RF pulse synchronization, along with an effect of over-quenching on achievable ROCs. Through the descriptions and examples to be provided, concurrent use of the open-loop, over-quench method improvement in system performance may be illustrated.

Two hypotheses may be defined as follows.

H0: no packet is on air.

H1: a true packet is on air.

Figure 9:
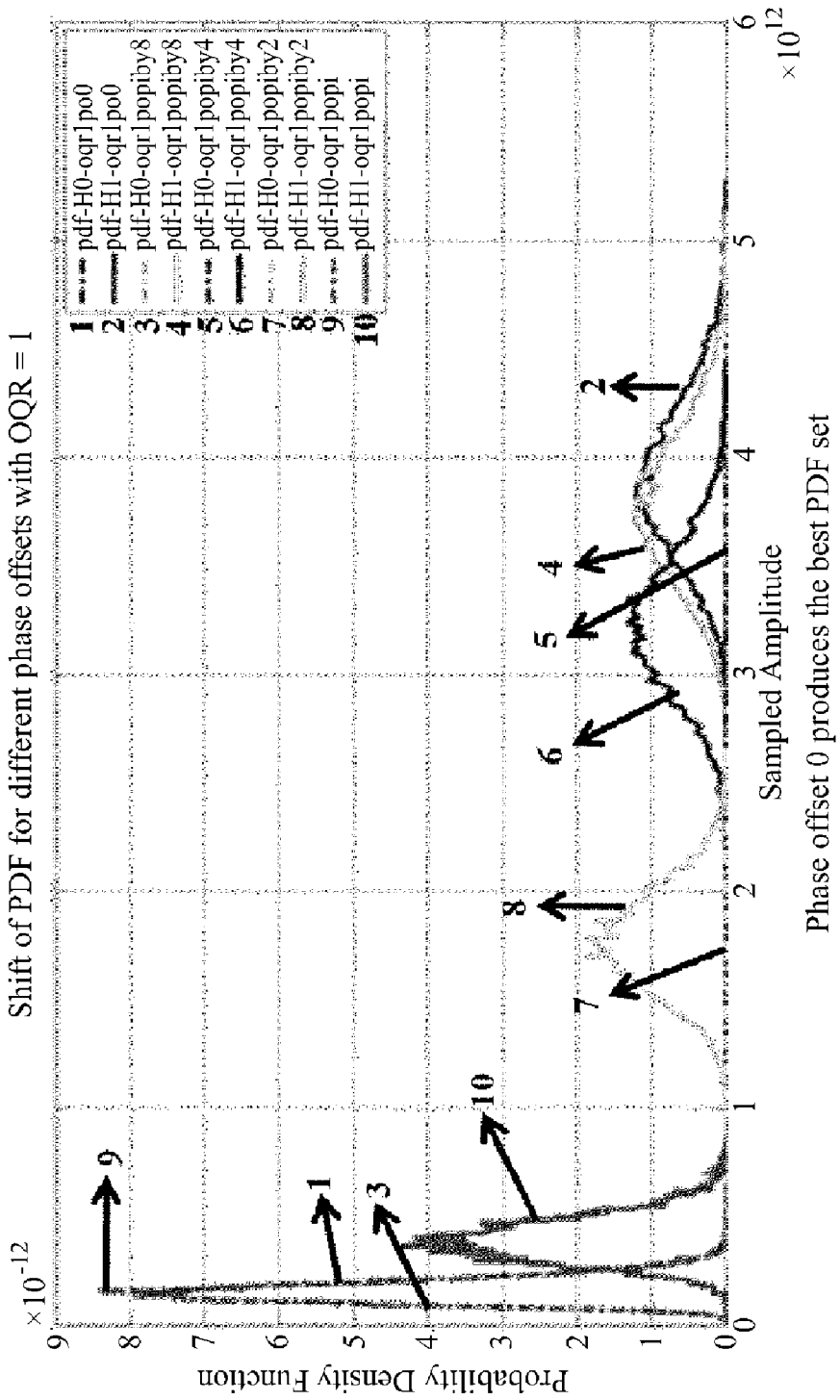
FIG. 9 is a graph illustrating an example of a probability density function (PDF) under two hypotheses to show an impact of a phase offset.

FIG. 9 illustrates an example of a probability density function (PDF) under two hypotheses to show an impact of a phase offset. Improving packet detection may be needed for a low SNR region, and thus, an ROC curve may provide information, by way of example, as to limits of a packet detection method with respect to a ($P_F$, $P_D$) pair. $P_F$ denotes a probability of a false alarm occurring, and $P_D$ denotes a probability of detection. For an example of pnlen=1, an output of an ADC may be squared and act as a decision metric, whereas a suitable dot product with a code may be needed for an example of pnlen>1. In FIG. 9, for a phase offset=0, PDFs may be maximally separated and produce an optimal PDF.

Figure 11:
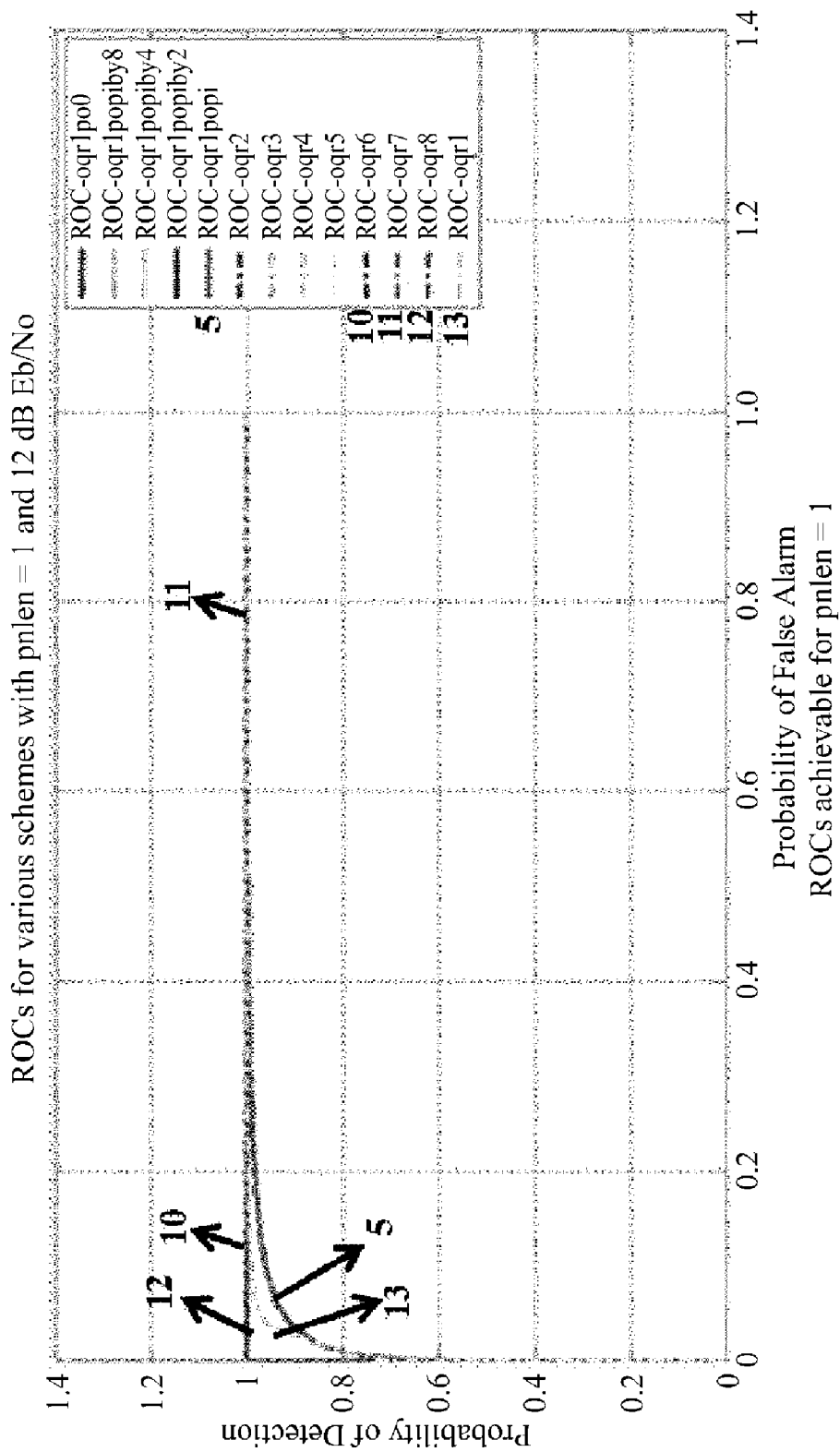
FIG. 11 is a graph illustrating an example of receiver operating characteristics (ROCs) for various schemes experimented with pnlen (a length of a direct-sequence spread spectrum code used)=1.

Production of an optimal PDF through maximally separating PDFs may also be verified from FIG. 11. However, obtaining an ROC with a phase offset of 0 may not be possible in a pre-packet detection stage.

Figure 10:
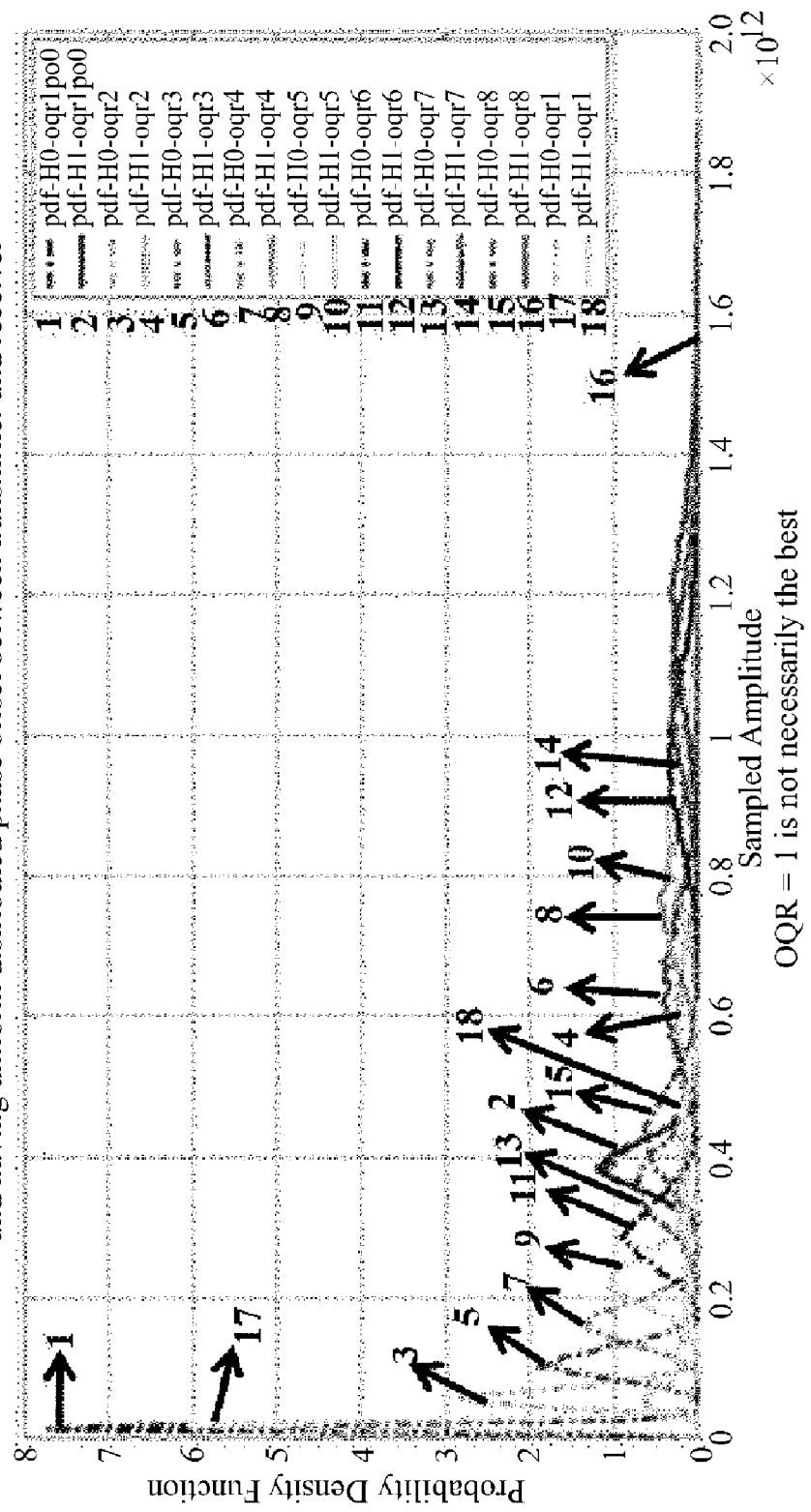
FIG. 10 is a graph illustrating an example of a PDF under two hypotheses while a random phase offset is introduced between a transmitter and a receiver.

Accordingly, it may be assumed that a phase offset is distributed uniformly between $-\pi$ and $+\pi$, and a plot of various PDFs and corresponding ROCs are shown in FIGS. 10 and 11, respectively. With phase offset=0, OQR=1 may be an optimal value, when compared to OQR>1, due to degradation in a selectivity as an OQR increases. When a random phase offset is considered, the ROC corresponding to OQR=1 may not be an optimal value. For example, packet detection may be improved by at least 2 to 3 decibels (dB) around a target operating $E_b/N_o$ corresponding to 12 dB. Therefore, various plots may be shown at the target operating $E_b/N_o$.

In FIG. 11, a favorable result may be obtained as a relatively high $P_D$ may be achieved with a relatively low $P_F$ because a number of ROCs is relatively inflexible. Simultaneously, the ROCs may not be used to determine an optimal OQR value because all the ROCs are relatively inflexible. Accordingly, a gap between the PDFs may be measured under two hypotheses, and the gap will be referred to as "dmX". The gap may be defined for an X amount of a tail probability.

Figure 12:
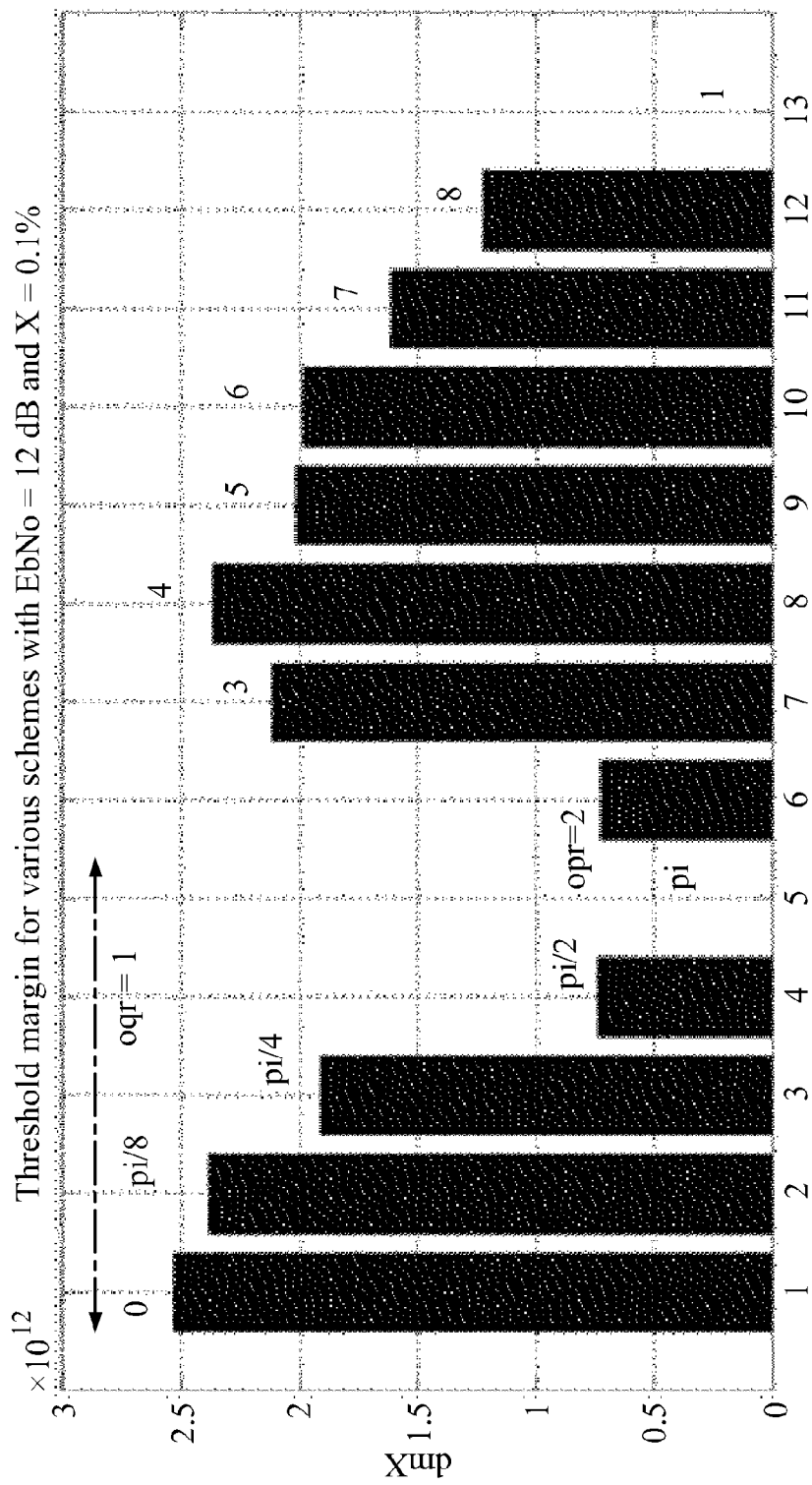
FIG. 12 is a graph illustrating an example of threshold margins for various schemes.

For example, a bar chart of FIG. 12 is plotted with X=0.1%. Referring to FIG. 12, although OQR=1 with phase offset=0 is the best, OQR=4 may be optimal when a random phase offset is considered. The plots from FIGS. 6 through 12 are for cases of pnlen=1 without a loss of generality. Accordingly, for ease of description, without limiting the scope of the disclosure thereby, values of pnlen=1, OQR=4 may be fixed, and packet detection may be completed with the fixed values. Through use of the fixed values, sufficiently good results in terms of $P_D$ and $P_F$ may be obtained for selected system parameters. However, for a different set of parameters, similar experiments may be conducted to select an optimal OQR.

Figure 13:
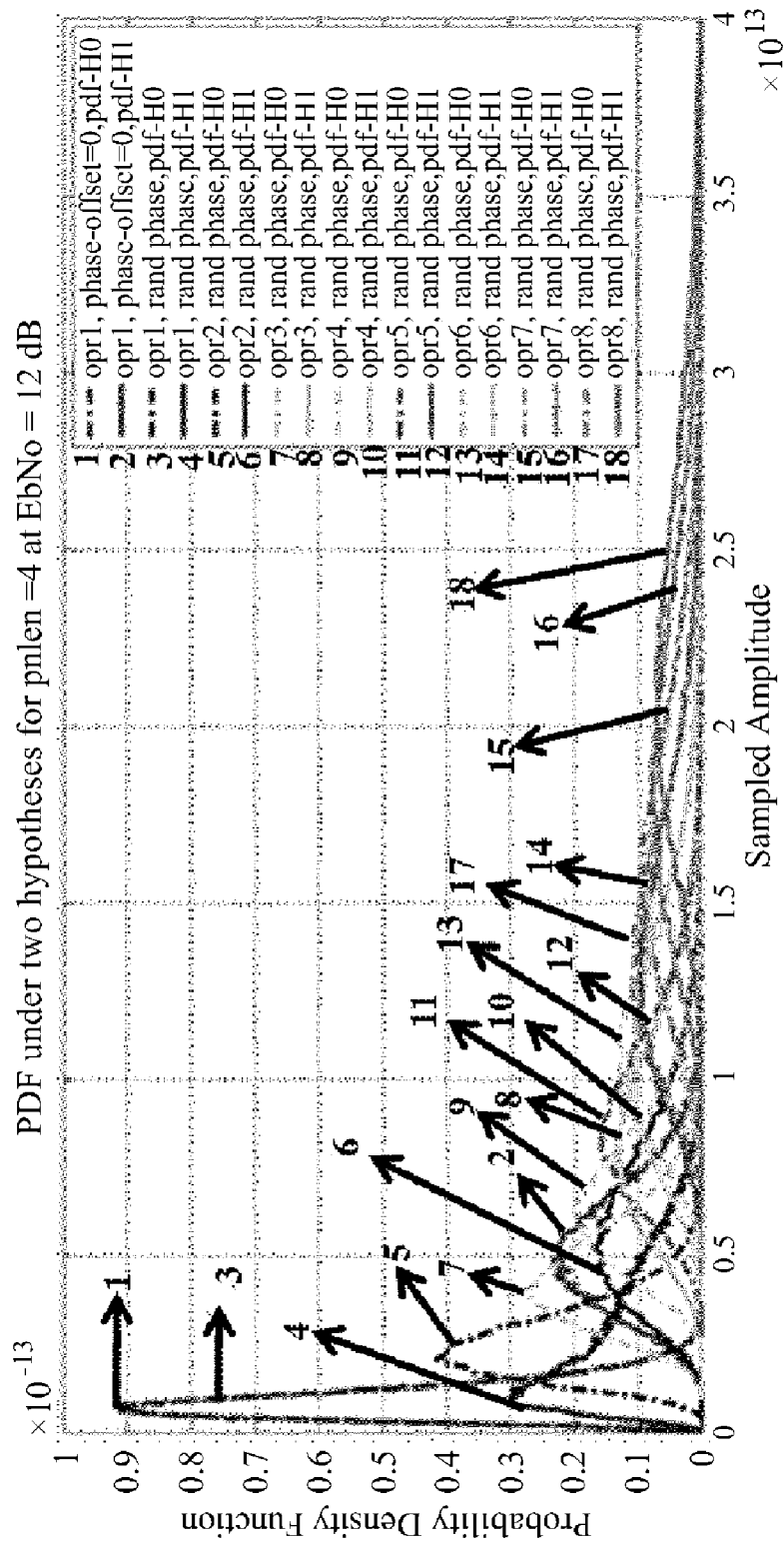
FIG. 13 is a graph illustrating an example of PDFs under two hypotheses experimented with pnlen=4.

Similarly, FIG. 13 is a graph illustrating an example of PDFs under two hypotheses, experimented with pnlen=4.

Figure 14:
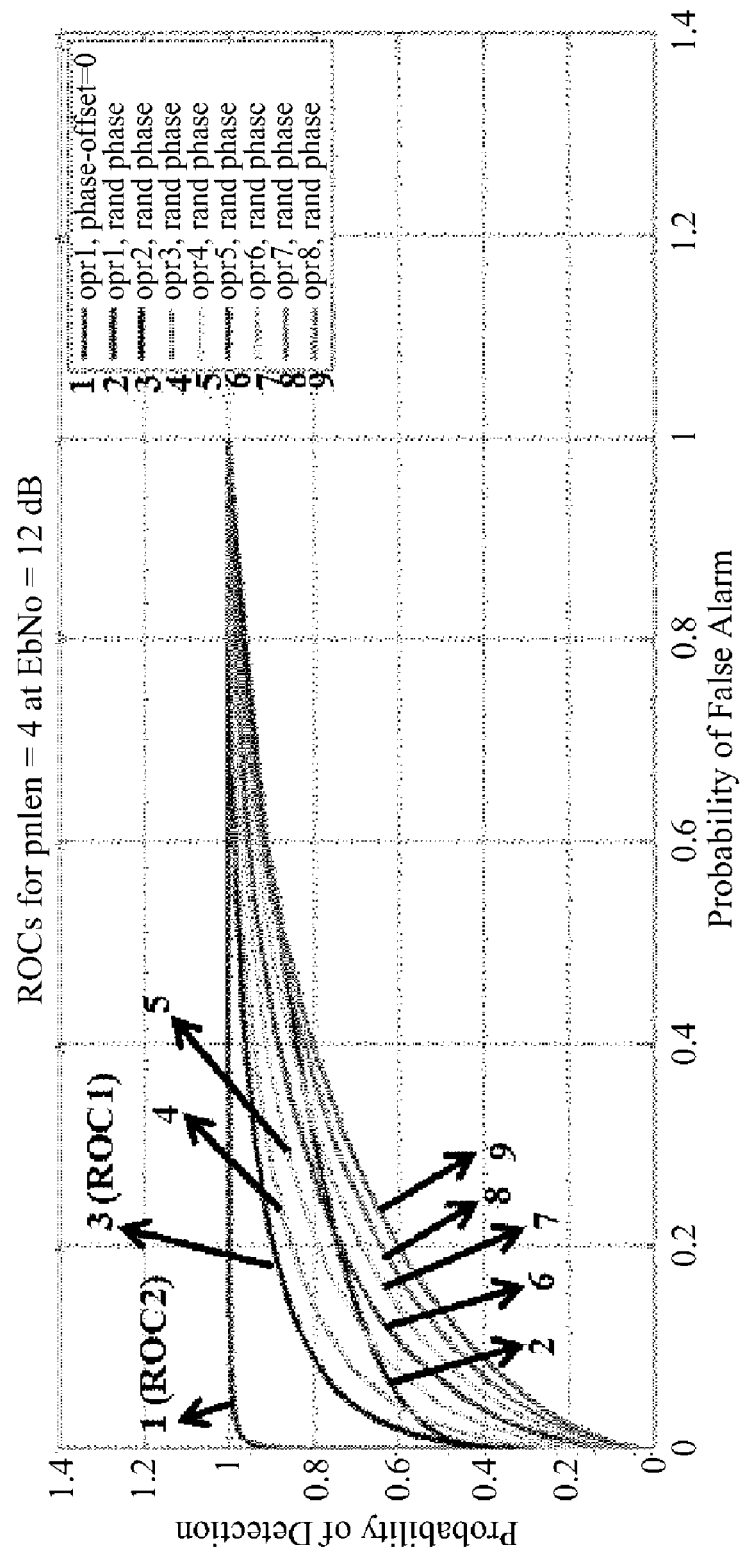
FIG. 14 is a graph illustrating an example of ROCs for a predetermined pnlen=4.

FIG. 14 illustrates an example of ROCs for a predetermined pnlen (a length of a direct-sequence spread spectrum code)=4. In FIG. 14, with phase offset=0, OQR=1 may be optimal. However, with a random phase, OQR=2 may be optimal. However, OQR=3, although relatively sufficient, may not be as optimal, which implies that, in order to achieve a high $P_D$ with a relatively low $P_F$, the $P_D$ may be maximized using an ROC of OQR=2 (called as ROC1) with a random phase. Then, a phase offset may be aligned, and OQR=1 may be fixed. The $P_F$ may be minimized using an ROC of OQR=1 with phase offset=0 (called as ROC2). As an ROC shows an existence of a pair of desired selection of ($P_D$, $P_F$) and different ROCs, use of a hybrid approach as described above may be proposed, and thus, a corresponding method may be developed.

As established in the previous sections, a hybrid approach in consideration of packet detection and RF pulse synchronization may be an optimal approach for performance, which may make use of multiple ROCs not existing simultaneously. Hereinafter, a method to achieve the foregoing will be described.

Figure 15:
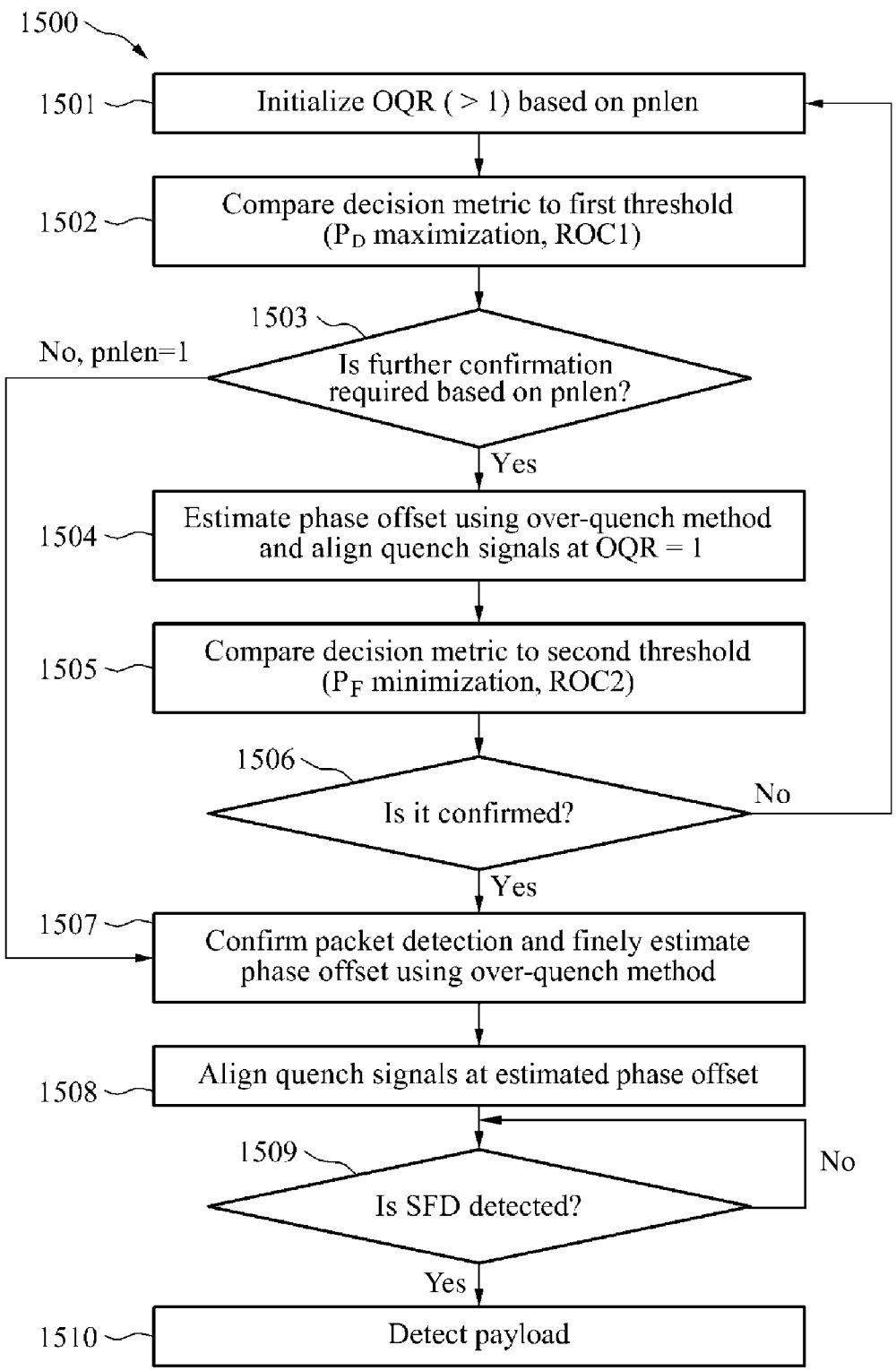
FIG. 15 is a flowchart illustrating an example of a hybrid method to maximize a packet detection probability and minimize a false alarm probability.

FIG. 15 illustrates an example of a hybrid method 1500 to maximize a packet detection probability and minimize a false alarm probability. In order to maximize the packet detection probability, in operation 1501, a receiver (an SRR) initializes an OQR to a value equal to 2 or 3 for pnlen=4, and to a value equal to 4 for pnlen=1. The value of the OQR may vary based on experiments and applications without limiting the example. The OQR may indicate a quench cycle generated by the quench oscillator 105 in the SRR of FIG. 1. As an example, the OQR may be initialized to an integer n.

In operation 1502, the receiver compares a decision metric (e.g., related to an incoming signal at the OQR greater than 1) to a first threshold value (set to maximize the packet detection probability $P_D$). The first threshold value may relate to a first ROC (ROC1). For example, the SRR may use a direct sequence spread-spectrum (DSSS) for low power and other system-related issues. In this example, a hard or soft correlation with a predetermined pn sequence may be performed on an incoming signal to form the decision metric. That is, the decision metric refers to a result value of performing a hard decision-based correlation or a soft decision-based correlation on the incoming signal with the pn sequence.

In this operation, when the decision metric is greater than a packet detection threshold (e.g., the first threshold value), a presence of a packet is recognized. When the decision metric is less than or equal to the packet detection threshold, an absence of the packet is recognized.

As the first threshold value decreases, the packet detection probability $P_D$ increases, and due to the first threshold value decreasing, the SRR tends to recognize the presence of the packet even through the correlation result value (the decision metric) is low. However, due to the aforementioned relationship, the false alarm probability $P_F$ occurring due to the recognition of the packet being transmitted despite the true packet being not transmitted, also increases.

In operation 1503, the receiver determines whether further confirmation of the packet detection or recognition is required based on the pnlen. Satisfactory detection performance may be achieved at all times through ROC1, by setting the first threshold value to a lower side. However, a minimum false alarm probability may not be achieved through the ROC1. Hence, the confirmation may be determined to minimize a false alarm probability by using a second ROC (ROC2). The confirmation may depend on various system parameters, such as, but not limited to, the pnlen. For example, in FIG. 15, the confirmation is determined based on the pnlen. Accordingly, if further confirmation of the packet detection is determined to be required based on the pnlen (i.e., if a need for a further decrease of a false alarm probability is determined), the method 1500 continues in operation 1504. Otherwise (i.e., if pnlen=1), the method 1500 continues in operation 1507.

In operation 1504, the receiver coarsely estimates a phase offset using an over-quench method (OQR>1), and aligns quench signals based on the estimated phase offset at OQR=1, an optimal setting for a selectivity. The phase offset is estimated to recognize a location at which a maximum phase point occurs. The quench signals may be aligned based on the estimated phase offset at OQR=1 to achieve the ROC2 over which a lesser false alarm probability is achievable, and to maximize the incoming signal. That is, the quench signals may be aligned based on the estimated phase offset to the location at which the maximum phase point occurs.

In operation 1505, the receiver compares the decision metric (e.g., related to the incoming signal aligned based on the estimated phase offset at OQR=1) to a second threshold value (set to minimize the false alarm probability $P_F$), which is greater than the first threshold value and may be calculated using deliberate calibration governed by ROC2. The second threshold value is considered a packet confirmation threshold. In this operation, when decision metric is greater than the packet confirmation threshold (e.g., the second threshold value), the presence of the packet is recognized and further confirmed. When the decision metric is less than or equal to the packet confirmation threshold, the absence of the packet is recognized.

In operation 1506, the receiver determines whether the presence of the packet is confirmed based on a result of the comparing of the decision metric to the second threshold value. If the presence of the packet is determined to be confirmed, the method 1500 continues in operation 1507. Otherwise, the method 1500 returns to operation 1501.

In operation 1507, the receiver confirms the packet detection, and finely estimates a phase offset, using the over-quench method (OQR>1).

In operation 1508, the receiver aligns the quench signals at the finely estimated phase offset, and operates at OQR=1 for a better selectivity.

In operation 1509, the receiver determines whether an SFD is detected. If the SFD is determined to be detected, the method 1500 continues in operation 1510. Otherwise, the method 1500 returns to operation 1509.

In operation 1510, the receiver detects a payload that follows the SFD.

The various operations in the method 1500 may be performed in the order presented, a different order, or simultaneously a combination thereof. Further, in several examples, a portion of operations of FIG. 15 may be omitted.

The examples of a method and a system described above may achieve a higher packet detection probability in a low SNR by using multiple ROCs. At a high SNR, the system may perform satisfactorily. A much higher packet detection probability may be achieved through usage of an optimal quench rate at different phases of the method.

For a higher SNR, operation on multiple ROCs to achieve a higher detection probability as well as a minimal false alarm probability may be unnecessary. However, a moderate increase in an averaging length may be performed to form decision statistics, e.g., a number of bits over which averaging is performed. However, for a relatively low SNR, an increase in the averaging length may not help to achieve satisfactory performance from a single ROC.

On a single ROC, when a detection probability increases, a false alarm probability may also increase, and vice versa. However, the described hybrid approach may achieve increased detection probability and decreased false alarm probability, by operating on two ROCs obtained by joint consideration of packet detection and RF pulse synchronization with the optimal usage of system parameters, for example, an OQR. Conversely, for a higher SNR, the hybrid approach may produce satisfactory performance by reducing the averaging length, thereby reducing power. When the averaging length is relaxed, better RF pulse synchronization may be achievable. The hybrid approach may have benefits in terms of power saving or in terms of synchronization performance depending on a desired selection of optimization. In addition, independent of RF pulse synchronization, OQR=1 may be used for a better BER performance.

The various elements and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of increasing a performance of a super-regenerative receiver (SRR), the method comprising:
    initialize a quench rate to be greater than or equal to 2 based on a parameter;
    comparing a decision metric to a lower threshold value, the decision metric established from a first receiver operating characteristic (ROC);
    estimating a phase offset, using an over-quench method, and aligning quench signals at the quench rate of 1;
    comparing the decision metric to a higher threshold value to minimize a false alarm probability;
    confirming packet detection and the phase offset, using the over-quench method;
    aligning the quench signals based on the confirmed phase offset;
    determining whether a start frame delimiter (SFD) is detected after aligning the quench signals based on the confirmed phase offset; and
    detecting a payload in response to the SFD being determined to be detected.

2. The method of claim 1, wherein the parameter comprises a length of a direct-sequence spread spectrum code, or an over-quench rate (OQR), or an SRR gain, or a modulation scheme, or a target signal-to-noise ratio (SNR), or a bandwidth, or a pulse-shape filter response, or a selectivity, or any combination thereof.

3. The method of claim 1, wherein the comparing of the decision metric to the lower threshold value comprises:
    comparing the decision metric to the lower threshold value, the decision metric established from the first ROC, to maximize a packet detection probability.

4. The method of claim 1, wherein the comparing of the decision metric to the higher threshold value comprises:
    comparing the decision metric to the higher threshold value, the decision metric established from a second ROC, to minimize the false alarm probability for optimal packet detection and false alarm probability performance.

5. An apparatus configured to increase a performance of a super-regenerative receiver (SRR), the appratus comprising:
    a super-regenerative oscillator;
    a quench oscillator; and
    an envelope detector,
    wherein the apparatus is configured to:
        initialize a quench rate to be greater than or equal to 2 based on a parameter,
        compare a decision metric to a lower threshold value, the decision metric established from a first receiver operating characteristic (ROC),
        estimate a phase offset, using an over-quench method, and aligning quench signals at the quench rate of 1,
        compare the decision metric to a higher threshold value to minimize a false alarm probability,
        confirm packet detection and the phase offset, using the over-quench method,
        align the quench signals based on the confirmed phase offset,
        determine whether a start frame delimiter (SFD) is detected after align of the quench signals based on the confirmed phase offset, and detect a payload in response to the SFD being determined to be detected.

6. The apparatus of claim 5, wherein the parameter comprises a length of a direct-sequence spread spectrum code, or an over-quench rate (OQR), or an SRR gain, or a modulation scheme, or a target signal-to-noise ratio (SNR), or a bandwidth, or a pulse-shape filter response, or a selectivity, or any combination thereof.

7. The apparatus of claim 5, wherein the apparatus is further configured to:
compare the decision metric to the lower threshold value, the decision metric established from the first ROC, to maximize a packet detection probability.

8. The apparatus of claim 5, further configured to:
compare the decision metric to the higher threshold value, the decision metric established from a second ROC, to minimize the false alarm probability for optimal packet detection and false alarm probability performance.

9. A receiver configured to handle packet detection and radio frequency (RF) pulse synchronization, the receiver comprising:
a super-regenerative oscillator;
a quench oscillator; and
an envelope detector,
wherein the receiver is configured to:
    initialize a quench rate to be greater than or equal to 2 based on a parameter,
    compare a decision metric to a lower threshold value, the decision metric established from a first receiver operating characteristic (ROC),
    estimate a phase offset, using an over-quench method, and aligning quench signals at the quench rate of 1,
    compare the decision metric to a higher threshold value to minimize a false alarm probability,
    confirm packet detection and the phase offset, using the over-quench method,
    align the quench signals based on the confirmed phase offset,
    determine whether a start frame delimiter (SFD) is detected after align of the quench signals based on the confirmed phase offset; and
    detect a payload in response to the SFD being determined to be detected.

10. The receiver of claim 9, further configured to:
handle the RF pulse synchronization between an input signal and the quench signals generated by the quench oscillator with the receiver.

11. A super-regenerative receiver (SRR) comprising:
a super-regenerative oscillator;
a quench oscillator; and
an envelope detector,
wherein the SRR is configured to:
    initialize a quench rate to be greater than 1 based on a parameter;
    determine whether a packet is detected based on whether a decision metric is greater than a first threshold set to maximize a packet detection probability,
    determine whether confirmation of the packet detection is needed based on the parameter,
    estimate a phase offset,
    align quench signals based on the phase offset at the quench rate of 1,
    confirm whether the packet is detected based on whether the decision metric is greater than a second threshold set to minimize a false alarm probability, in response to the confirmation of the packet detection being determined to be needed,
    confirm phase offset,
    align the quench signals based on the confirmed phase offset,
    determine whether a start frame delimiter (SFD) is detected after align of the quench signals based on the confirmed phase offset, and
    detect a payload in response to the SFD being determined to be detected.

12. The SRR of claim 11, wherein the parameter comprises a length of a direct-sequence spread spectrum code.

13. The SRR of claim 11, further configured to:
perform a correlation on an input signal based on the quench rate.

14. The SRR of claim 11, wherein the first threshold is greater than the second threshold.

15. The SRR of claim 11, further configured to:
re-estimate the phase offset at the quench rate of greater than 1, and re-align the quench based on the re-estimated phase offset, in response to the packet being confirmed to be detected.

* * * * *